Patented Nov. 6, 1923.

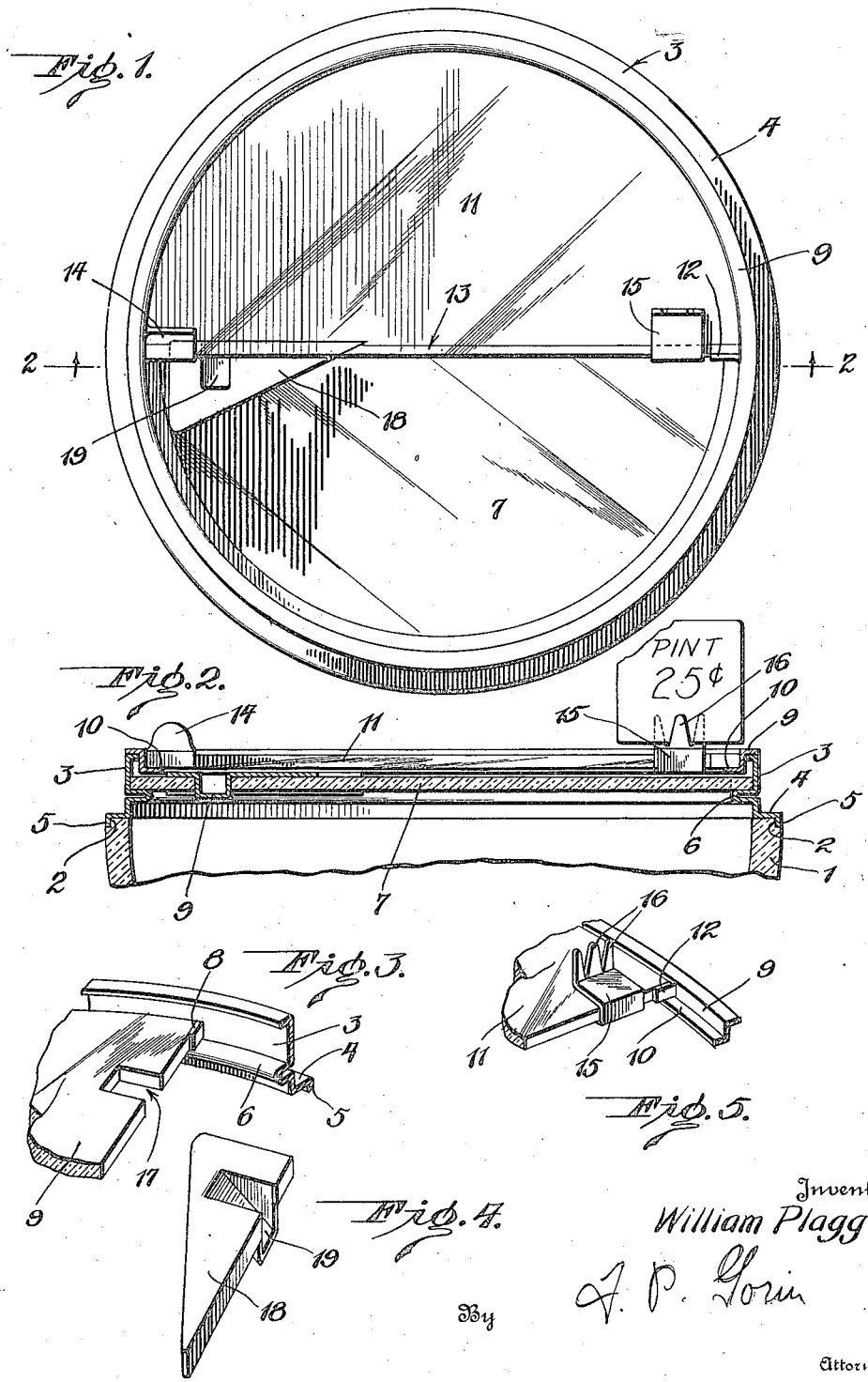

1,473,043

UNITED STATES PATENT OFFICE.

WILLIAM PLAGG, OF SEATTLE, WASHINGTON.

CONTAINER COVER.

Application filed October 19, 1922. Serial No. 595,550.

*To all whom it may concern:*

Be it known that WILLIAM PLAGG, a citizen of the United States, residing at Seattle, in the county of King and State of Washington, has invented certain new and useful Improvements in Container Covers, of which the following is a specification.

This invention relates to container covers.

An object of the invention is to provide an improved cover for crocks and jars and the like used in stores for containing pickles, preserves, et cetera, to be dispensed in small quantities.

Another object of the invention is to provide a partial cover section mounted in a rim adapted to fit the upper edge of the container and form a stationary section, and another partial cover section mounted in a rim fitting within the first rim and rotatable in said rim, so that the two sections will completely cover the container or the last mentioned or movable section may be rotated to provide access to the contents thereof.

A further object of the invention is to provide a price tag holder on the movable cover section for holding a card indicating the contents and price thereof, and a handle for operating the movable section.

Another object of the invention is to provide a spoon holder in the stationary section, adapted to receive the handle of a spoon or dipper in the contents of the container and prevent the handle from slipping into said container.

In the drawings:

Fig. 1 is a plan view of the cover with the sections in closed position.

Fig. 2 is a sectional view on line 2—2 of Fig. 1.

Fig. 3 is a detail perspective view, showing the manner of holding the lower cover section in place.

Fig. 4 is a perspective view of the spoon holder.

Fig. 5 is a perspective view of the movable cover and price tag holder.

A bowl 1 for containing material, such as pickles, fruit, et cetera, for sale in a store, is provided at the outer upper edge with an annular recess 2. A stationary rim member 3 is formed on its lower end with an outwardly extending flange 4 having a downwardly turned edge 5, the flange 4 fitting the brim of the bowl 1 and the edge 5 seating in the annular recess 2 for holding the rim in position on the bowl. It is obvious however, that the edge 5 will extend over the outer edge of the bowl instead of providing the recess 2 for receiving it.

The rim member is formed intermediate its ends with an inwardly extending annular bead 6, for supporting the glass cover section 7 of semi-circular form, which is held in contact with the rim by lugs 8, which are struck out of the rim or welded thereto at substantially diametrically opposite points and engage the straight edges of the glass for holding it stationary in the rim.

A second rim member 9 is provided with an inwardly extending flange 10 on the lower end for receiving and supporting a glass cover section 11 of semi-circular form held in place by lugs 12 extending from the rim 9 along the straight edge of the cover section. The rim member 9 fits in the upper end of the rim 3 above the cover section therein, and is adapted to be freely rotated therein, so that the cover sections may be disposed over opposite portions of the bowl and form a cover therefor, at which time it will be noted that the straight edges overlap as indicated at 13. A handle 14 is secured to the rim 9 and extends over the straight edge of the glass plate as shown, providing means which may be grasped for rotating the movable rim 9. Near the other end of the straight edge of the cover section 11, a clip 15 extends around the edge and grips the opposite faces of the plate, upstanding projections 16 on the end of the clip serving to hold a price tag.

The cover section 7 in the stationary rim 3 is provided at 17 with a recess extending through the straight edge. A plate 18 is mounted at the corner of the cover section being secured to the rim 3 and formed with an inclined portion 19 extending into the recess 17 and adapted to receive and hold the handle of a spoon extending into the container. As shown in the drawing, the spoon does not interfere with the rotation of the movable cover to close the container.

The clip 15 extending under the glass cover 11 does not interfere in any way with the rotation of the cover as the flange 10 separates the plates slightly, and the thickness of the clip can be made less than the flange.

What I claim is:

1. A cover, comprising a rim having a receptacle engaging flange on the lower end, and an inwardly extending flange between the ends, a cover section partially filling said rim seated on the inwardly extending flange, a movable rim mounted in the upper end of the first mentioned rim and above the cover section, and a cover section mounted in the movable rim and movable therewith, said cover sections being adapted to completely close the opening within the rims.

2. A cover, comprising a stationary rim for fitting a receptacle, a cover section mounted in the rim partially closing the opening therein, a rim movably mounted in the stationary rim, and a cover section mounted therein partially filling said rim, said cover sections being adapted to completely close the opening through the rims.

3. A cover, comprising a stationary rim for fitting a receptacle, a cover section mounted in the rim partially closing the opening therein and formed with a recess in one edge, a plate having a portion fitting in said recess mounted on said cover section and forming a spoon holder, a rim movably mounted in the stationary rim, and a cover section mounted therein partially filling said rim, said cover sections being adapted to completely close the opening in the rims.

4. A cover, comprising a stationary rim for fitting a receptacle, a cover section mounted in the rim partially closing the opening therein, a rim movably mounted in the stationary rim, a cover section partially filling said movable rim, and a handle carried by the movable rim and cover section by which it is moved, said cover sections being adapted to completely close the opening through the rims.

5. A cover, comprising a stationary rim for fitting a receptacle, a cover section mounted in the rim partially closing the opening therein, a rim movably mounted in the stationary rim, a cover section partially filling said movable rim, and a price tag holder mounted on the cover section in the movable rim.

In testimony whereof I affix my signature.

WILLIAM PLAGG.